Feb. 21, 1961   J. W. HAAS ET AL   2,972,570
THIN FILM CERAMIC CAPACITOR AND METHOD OF MAKING
Filed April 7, 1955

John W. Haas
Waldo B. England
INVENTORS

BY
ATTORNEYS

United States Patent Office 2,972,570
Patented Feb. 21, 1961

2,972,570

THIN FILM CERAMIC CAPACITOR AND METHOD OF MAKING

John W. Haas and Waldo B. England, Rochester, N.Y., assignors to Eastman Kodak Company, Rochester, N.Y., a corporation of New Jersey Filed Apr. 7, 1955, Ser. No. 499,854

12 Claims. (Cl. 204—38)

This invention relates to a thin film high dielectric constant ceramic capacitor and to the method of making the same.

Extruded ceramic tubular capacitors have been successfully made for a number of years. This type of known ceramic capacitor is not satisfactory in some modern installations where miniaturization and compactness is a prime consideration for the reason that to obtain the capacitance in the range desired and having adequate strength and ruggedness, the capacitor needs to be of relatively large dimensions, or made from a material having generally undesirable temperature characteristics. Attempts have been made to utilize thin layers or films of high dielectric constant ceramic material in the manufacture of capacitors because of the high capacitance which can be obtained with a dimensionally small capacitor, but extreme difficulty is encountered in adapting them to a practical assembly process due to the fact that such thin ceramic layers are very fragile and brittle. For this reason these attempts to so utilize thin layers of high dielectric constant ceramic material have failed.

In accordance with the present invention a thin coating of unfired ceramic material is applied over a metal electrode and subsequently is fired with the electrode to obtain vitrification of the ceramic material. The use of the term "thin coating" or "thin film" when referring to the coating of ceramic material in the specification and claims is intended to define a layer of material which is not over .015 inch thick and preferably less than .006 inch thick and the use of the term "relatively high dielectric constant" when used in the specification and claims is intended to define a dielectric constant in the range of 30 to 6,000 with the negative positive zero (NP0) in the range of dielectric constant of 30 to 80. Since it is not possible to extrude a layer of unvitrified ceramic material of less than .015 inch thickness because of its fragility and lack of rigidity, and for the same reason it is not possible to roll out layers of unvitrified ceramic material of less than .006 inch thickness, it will be appreciated therefore that some other methods of application must be utilized. While still other methods of application of the ceramic material may be possible, those recommended for the practice of the invention include dipping the metal electrode in a slurry of the unfused ceramic material, and painting or spraying a slurry of the unfused ceramic material onto the metal electrode. The slurry is formed by mixing unfused ceramic material powder in a vehicle such as water or one of the organic solvents as for example ethyl alcohol, isobutyl alcohol and ethyl acetate. The ceramic material having a dielectric constant in the range of 30 to 6,000 which is preferred according to the invention, is formed of various compounds comprising barium titanate. However, ceramic materials which have a dielectric constant in the range of 30 to 6,000 and which are formed of various compounds comprising strontium titanate, magnesium titanate, calcium titanate, lead titanate, magnesium zirconate, calcium zirconate, barium zirconate, barium stannate, calcium stannate, bismuth stannate, nickel stannate, lead stannate, strontium stannate, and/or titanium dioxide can also be effectively utilized. The other elements in the barium titanate compounds and the percentage of barium titanate in any given compound used as the coating of ceramic material on the electrode varies, and is dependent only upon the desired dielectric constant and temperature coefficient of the capacitor when subjected to use within a given temperature range. Similarly the composition of the ceramic compounds other than the barium titanate compounds can be varied as desired. The composition in parts by volume of two typical barium titanate ceramic compounds is as follows:

| | | | |
|---|---|---|---|
| 1. Barium titanate, 100 parts. | Calcium fluoride, 1 part. | | Approximate Dielectric constant, 1200. |
| 2. Barium titanate, 80 parts. | Barium stannate, 10 parts. | Strontium titanate 10 parts. | Approximate Dielectric constant, 3500. |

The metal electrode over which the thin layer of ceramic material is coated, may be made of any metallic element or any metal alloy which does not oxidize during vitrification of the layer of ceramic material. The metallic elements which form group 8 series 6 and 8 of the periodic table, that is ruthenium, rhodium, palladium, osmium, iridium and platinum, do not oxidize within the range of temperatures used for vitrification of the thin layer of the ceramic material herein proposed and are therefore suitable for use as the metal electrode. Vitrification of the unfused ceramic materials herein proposed is accomplished within the temperature range of from 2000 to 2500 degrees Fahrenheit. In those instances where the metal electrode is applied over a support means, this can be accomplished by dipping the support into a fine particle slurry of the metal, electroplating the metal onto the support means, using thin drawn metal parts, or wiping the support means with a liquid metal such as for example "Hanovia" liquid metal which is a dispersion of a metal salt radical produced and sold by the Hanovia Chemical and Manufacturing Company. In order to metalize the "Hanovia" liquid metal coating, it must be heated at a temperature ranging from 1200 and 1600 degrees Fahrenheit depending upon the type and character of the support and the type of liquid metal used. It is understood that it is also necessary to metalize the metal electrode when it is applied onto the support means as a coating of fine particle slurry. Vitrification of the thin coating of unfused ceramic material is accomplished in an oven or kiln at a temperature of approximately 2000 to 2500 degrees Fahrenheit as stated supra, and for a period of time sufficient to provide complete vitrification of the ceramic material. It has been found that the most desirable results and initimate bonding are obtained when both the metalizing of the metal electrode and vitrification of the thin ceramic layer on the electrode are done simultaneously though a satisfactory capacitor can be produced by firing each film separately.

It is therefore an object of the present invention to provide a capacitor utilizing a thin film of relatively high dielectric constant ceramic material which is readily adaptable to a practical assembling process.

A further object of the present invention is to provide a method of making a capacitor utilizing a thin film of relatively high dielectric constant ceramic material.

A still further object of the present invention is to provide a thin film relatively high dielectric constant ceramic capacitor in which the ceramic material has a dielectric constant of more than 30.

Yet another object of the present invention is to provide a capacitor utilizing a thin film of relatively high dielectric constant ceramic material applied over a metal which does not oxidize during vitrification of the ceramic material.

Other objects and advantages will become readily apparent to those skilled in the art from the following description with reference to the drawing in which like characters denote like parts and wherein.

Figure 1:
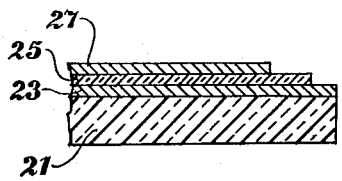
Fig. 1 is an enlarged cross-sectional view of our invention illustrating the general construction thereof.

The general construction of a ceramic capacitor according to our invention and the method of making it can best be explained by reference to the simplified illustration of Fig. 1 in which the numeral 21 designates a support member of steatite or other low grade inexpensive material which can withstand firing temperatures of between 2000 and 2500 degrees Fahrenheit. A metal layer 23 which is to serve as the inner electrode of the capacitor, is deposited on support 21 preferably by dipping support 21 in a fine particle slurry of the metal. In order to adapt the manufacture of the capacitor to a particular installation one may instead prefer to electrodeposit the metal electrode on the support, wipe onto the support "Hanovia" or other liquid metal, or use thin drawn metal parts. We prefer to use platinum or palladium alloys to the other suitable metal alloys or metals including those metallic elements which form group 8 series 6 and 8 of the periodic table, for the reason that at the present time these are the least expensive. As was stated supra, the alloy selected must be able to withstand firing temperatures of approximately 2500 degrees Fahrenheit without oxidizing. Platinum in practice, is generally alloyed with the small percentage of from ½% to 10% by weight iridium and provides a very satisfactory metal electrode.

The unfused ceramic layer 25 which is deposited over metal layer 23 is preferably a compound comprising barium titanate having the desired electrical, mechanical, and temperature coefficient properties. As noted supra, however, the unfused ceramic layer 25 can be a compound comprising strontium titanate, magnesium titanate, calcium titanate, lead titanate, magnesium zirconate, calcium zirconate, barium zirconate, barium stannate, calcium stannate, bismuth stannate, nickel stannate, lead stannate, strontium stannate, and/or titanium dioxide. Of those methods previously noted supra, we prefer to dip the support 21 having layer 23 coated thereon, into a slurry formed of a very fine unfused ceramic material powder having a grain size finer than 400 mesh mixed in a vehicle such as water and having a viscosity sufficient to provide the desired thickness of ceramic layer 25, when dipped and removed from the slurry one or more times. The thickness of ceramic layer 25 which is deposited over layer 23 as the result of the dipping process can be readily varied and controlled by varying the grain size of the unfused ceramic material powder and/or the viscosity of the slurry. As is known by those skilled in the art, the viscosity can be increased by increasing the amount of the unfused ceramic material powder used and/or by substituting a more viscous vehicle for the one previously used. Similarly the viscosity of the slurry can be decreased by increasing the amount of the vehicle used and/or by substituting a less viscous vehicle for the one previously used. The use of a unfused ceramic material powder having a finer grain size permits a thinner coating to be deposited over layer 23 as the result of one dip in the slurry while the use of an unfused ceramic material powder having a coarser grain size results in a thicker coating being deposited as a result of one dip in the slurry. The thickness of ceramic layer 25 can also be increased by increasing the number of times that the support 21 having layer 23 coated thereon, is dipped into the slurry. The support 21 having layer 23 and 25 deposited thereon is first subjected to a low temperature drying atmosphere for a period of time sufficient to remove the vehicle from layers 23 and/or 25 and is thereafter placed in an oven or kiln operating at a temperature of approximately 2000 to 2500 degrees Fahrenheit for a sufficient period of time to allow for complete vitrification of ceramic layer 25 and complete metalization of metal layer 23 to thus provide the best electrical and mechanical properties.

After the complete vitrification of ceramic layer 25, metal layer 27 is deposited over the layer 25. Metal layer 27 which is to serve as the outer electrode for the capacitor, is preferably made of copper and deposited by electroplating the surface of layer 25 with copper. Other suitable metals or metal alloys, such as for example silver, rhodium, cadmium, zinc and gold can be used instead of copper depending upon the desired capacitor characteristics as known to those skilled in the art and can be deposited by electroplating which is preferred, dipping in a fine particle slurry, wiping on "Hanovia" or other liquid metal or painting on a metal paint such as that for example which is produced by the E. I. du Pont de Nemours and Co. particularly for this purpose. It must be remembered however that if metal layer 27 is deposited on ceramic layer 25 by any means other than electroplating it must be fired at a temperature sufficient to convert the powerdered metal to a solid, that is, metalize the layer 27.

Figure 2:
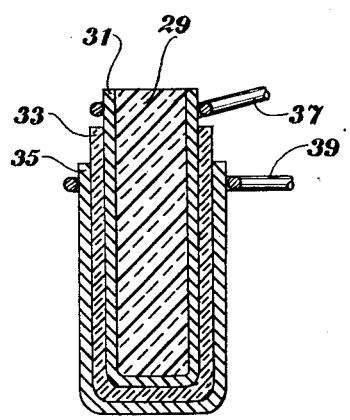
Figs. 2 and 3 are enlarged cross-sectional views illustrating two forms of capacitors made in accordance with our invention.
Figure 3:
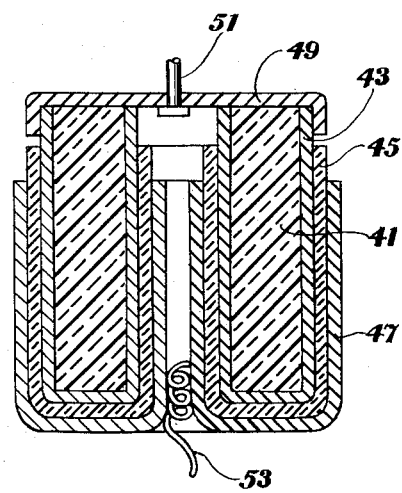

In Fig. 2 and Fig. 3, we have illustrated two alternate forms which can be taken by the capacitor when made in accordance with the method and construction outlined above with regard to Fig. 1. In Fig. 2 support 29 is preferably made in the form of a cylinder of steatite on which are successively coated metal layer 31 which serves as the inner electrode, ceramic layer 33 and metal layer 35 which serves as the outer electrode, as described above. However as was stated with reference to Fig. 1, support 29 can be made of any other low grade ceramic material which can withstand firing temperatures of between 2000 and 2500 degrees Fahrenheit. Leads 37 and 39 are secured by known techniques to metal layers 31 and 35 respectively. As illustrated in Fig. 3, support 41 is made in the form of a hollow cylinder of steatite on which are coated both on the inside and outside of the cylinder, successive layers of metal 43 which serves as the inner electrode, ceramic 45 and metal 47 which serves as the outer electrode in accordance with the method described above with regard to Fig. 1. On one end of the cylindrical support 41 and in contact with the inside metal layer 43 is positioned a metal cap 49 provided with a lead 51. In contact with the outside metal layer 47 and within the hollow cylinder is secured lead 53. It will be obvious to those skilled in the art that the capacitor illustrated in Fig. 3 has an advantage over the one illustrates in Fig. 2 in that it has a greater capacitance while not being much larger in exterior size due to the fact that the surface area of the dielectric spaced metal layers is greatly increased.

Figure 4:
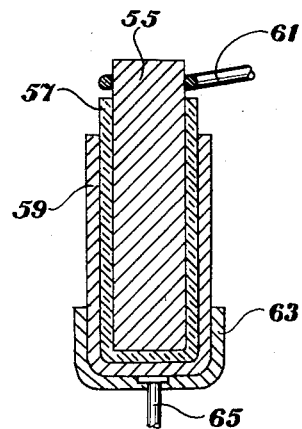
Fig. 4 is an enlarged cross-sectional view of a capacitor made in accordance with a modification of our invention.

According to the embodiment of our invention as illustrated in Fig. 4, the support 55 serves as the inner electrode and is made of any metal or metal alloy which does not oxidize during vitrification at temperatures of approximately 2000 to 2500 degrees Fahrenheit of the ceramic layer 57 which is coated thereon. While we prefer to use platinum or palladium alloys because these are the least expensive at the present time, any one of the metallic elements which comprise group 8 series 6 and 8 of the periodic table including ruthenium, rhodium, palladium, osmium, iridium, and platinum can be effectively utilized. The unfused ceramic layer 57 is applied over the metal support 55 preferably by dipping in a slurry of water and the unfused powdered ceramic material comprising barium titanate, in the same manner as previously described with reference to Fig. 1 and as employed in the construction of the capacitors illustrated in Figs. 2 and 3. As noted supra, however, with reference to Fig. 1, the unfused ceramic layer 57 can comprise strontium titanate, magnesium titanate, calcium titanate, lead titanate, magnesium zirconate, calcium zirconate, barium zirconate, barium stannate, calcium stannate, bismuth stannate, nickel stannate, lead stannate, strontium stannate, and/or titanium dioxide. Over layer 57 a metal layer 59 which serves as the outer electrode, is deposited. The metal forming layer 59 and the method of depositing is the same as that previously described for the outer electrode metal layer 27 with reference to Fig. 1, and as employed in the construction of the capacitors illustrated in Figs. 2 and 3. While support 55 itself can serve as a lead, we have illustrated instead a lead 61 secured to an end of support 55 not having a coating of ceramic layer 57. On the other end of support 55 in contact with metal layer 59 a cap 63 having a lead 65 is secured.

It will now be appreciated by those skilled in the art that our invention permits a great reduction in the manufacturing cost along with dimensional miniaturization of capacitors resulting from the successful use of a ceramic material having a relatively high dielectric constant. Also the capacitor may take any shape given to the support. Furthermore the capacitance can be changed as desired by merely varying the thickness or dielectric constant of the ceramic layer which is deposited during the manufacturing process. It will be apparent to those skilled in the art that several ceramic layers can be used either in series or spaced by suitable metal layers which are connected in parallel. Since in certain applications, it is necessary to utilize a capacitor of a more rugged design than that produced with a steatite core, a stronger and harder material can be substituted therefore. Should one desire, a capacitor having a solid metal support as described with reference to Fig. 4, or having a thin walled metal support, or having a laminated support formed of non-oxidizing metals, can also be used.

These and other modifications of our invention are possible and will be readily recognized by those skilled in the art, and therefore the present disclosure is intended to be illustrative only, and the scope of the invention is defined by the appended claims.

Having now particularly described my invention, what we desire to secure by Letters Patent of the United States and what we claim is:

1. The method of making an electric capacitor which comprises providing a slurry consisting of unfused ceramic material having a dielectric constant when vitrified of greater than 30, in a vehicle which can be evaporated without leaving a residue, providing a metallic capacitor electrode capable of supporting said slurry and which is nonoxidizable in air at temperatures up to and including the temperature at which said ceramic material vitrifies, applying a coating of said slurry to said electrode, heating said coating in situ to evaporate said vehicle therefrom, vitrifying the ceramic material of said coating on said electrode, and applying a coating of metal over the vitrified ceramic material on said electrode to form a second electrode for the capacitor.

2. The method of making an electric capacitor which comprises providing a fine particle slurry consisting of unvitrified ceramic material having a dielectric constant when vitrified of greater than 30, in a vehicle which can be evaporated without leaving residue, providing a metallic capacitor electrode capable of supporting said slurry and which is nonoxidizable in air at temperatures up to and including the temperature at which said ceramic material vitrifies, applying a thin coating of said slurry to said electrode, heating said coating in situ to evaporate said vehicle therefrom and to vitrify the ceramic material of said coating on said electrode, and electrodepositing a metal layer over the vitrified ceramic material on said electrode to form a second electrode for the capacitor.

3. The method of making a capacitor which comprises providing a slurry consisting of unfired powdered ceramic material having a dielectric constant when vitrified of greater than 30, in a vehicle which can be evaporated without leaving a residue, providing a metallic capacitor electrode capable of supporting said slurry and which is nonoxidizable in air at temperatures up to and including the temperature at which said ceramic material vitrifies, dipping said electrode into said slurry to apply a coating of said slurry on said electrode, evaporating said vehicle from said coating on said electrode, heating said coating on said electrode to vitrify the ceramic material of said coating on said electrode, and applying a coating of metal over the vitrified ceramic material on said electrode to form a second electrode for the capacitor.

4. The method of making an electric capacitor which comprises providing a fine particle slurry consisting of unfused ceramic material having a dielectric constant when vitrified of greater than 30, in a vehicle which can be evaporated without leaving a residue, providing a metallic capacitor electrode capable of supporting said slurry and which is nonoxidizable in air at temperatures up to and including the temperature at which said ceramic material vitrifies, dipping said electrode into said slurry to apply a thin coating of said slurry on said electrode, heating said coating in situ to evaporate said vehicle therefrom, vitrifying the ceramic material of said coating on said electrode at a temperature of approximately 2,000–2,500° F., and electrodepositing a metal layer over the vitrified ceramic material on said electrode to form a second electrode for the capacitor.

5. The method of making an electric capacitor which comprises providing a slurry consisting of water and powdered unvitrified ceramic material having a dielectric constant when vitrified of greater than 30, providing a metallic capacitor electrode capable of supporting said slurry and which is nonoxidizable in air at temperatures up to and including the temperature at which said ceramic material vitrifies, applying a coating of said slurry on said electrode, evaporating the water from said coating on said electrode, vitrifying the ceramic material of said coating on said electrode at a temperature of approximately 2,000–2,500° F., and electrodepositing a coating of metal over the vitrified ceramic material on said electrode to form a second electrode for the capacitor.

6. The method of making an electric capacitor which comprises providing a fine particle slurry consisting of unfired ceramic material having a dielectric constant when vitrified of greater than 30, in a vehicle which can be evaporated without leaving a residue, providing a metallic capacitor electrode comprising a metallic element selected from the group consisting of ruthenium, rhodium, palladium, osmium, iridium and platinum, which electrode is capable of supporting said slurry and nonoxidizable in air at temperatures up to and including the temperature at which said ceramic material vitrifies, applying a coating of said slurry on said electrode, evaporating said vehicle from said coating on said electrode, heating said coating on said electrode to vitrify the ceramic material of said coating on said electrode, and coating a metal layer over the vitrified ceramic material on said electrode to form a second electrode for the capacitor.

7. The method of making an electric capacitor which comprises providing a slurry consisting of water and powdered unfused ceramic material having a dielectric constant when vitrified of greater than 30, providing a capacitor electrode capable of supporting said slurry and essentially consisting of a metallic element selected from the group consisting of ruthenium, rhodium, palladium, osmium, iridium and platinum and being nonoxidizable in air at temperatures up to and including the temperature at which said ceramic material vitrifies, applying a coating of said slurry on said electrode, heating said coating in situ to evaporate the water therefrom and to vitrify the ceramic material of said coating on said electrode, and applying a metal layer over the vitrified ceramic material on said electrode to form a second electrode for the capacitor.

8. The method of making an electric capacitor which comprises providing a slurry consisting of water and powdered unvitrified ceramic material having a dielectric constant when vitrified of greater than 30, providing a capacitor electrode capable of supporting said slurry and essentially consisting of a metallic element selected from the group consisting of ruthenium, rhodium, palladium, osmium, iridium and platinum and being nonoxidizable in air at temperatures up to and including the temperature at which said ceramic material vitrifies, spraying a coating of said slurry onto said electrode, heating said coating in situ to evaporate the water therefrom and to vitrify the ceramic material of said coating on said electrode, and coating a metal layer over the vitrified ceramic material on said electrode to form a second electrode for the capacitor.

9. The method of making an electric capacitor which comprises providing a slurry consisting of water and powdered unfired ceramic material having a dielectric constant when vitrified of greater than 30, providing a capacitor electrode capable of supporting said slurry and essentially consisting of a metallic element selected from the group consisting of ruthenium, rhodium, palladium, osmium, iridium and platinum and being nonoxidizable in air at temperatures up to and including the temperature at which said ceramic material vitrifies, painting a coating of said slurry on said electrode, evaporating the water from said coating on said electrode, heating said coating on said electrode to vitrify the ceramic material of said coating on said electrode, and applying a metal layer over the vitrified ceramic material on said electrode to form a second electrode for the capacitor.

10. The method of making an electric capacitor which comprises providing a slurry consisting of water and powdered unfired ceramic material having a dielectric constant when vitrified of greater than 30, providing a capacitor electrode capable of supporting said slurry and essentially consisting of a metallic element selected from the group consisting of ruthenium, rhodium, palladium, osmium, iridium and platinum and being nonoxidizable in air at temperatures up to and including the temperature at which said ceramic material vitrifies, dipping said electrode into said slurry to apply a coating of said slurry on said electrode, evaporating the water from said coating on said electrode, heating said coating on said electrode to vitrify the ceramic material of said coating on said electrode, and applying a metal layer over the vitrified ceramic material on said electrode to form a second electrode for the capacitor.

11. The method of making an electric capacitor which comprises providing a slurry consisting of water and powdered unfused ceramic material having a dielectric constant when vitrified of greater than 30, providing an electrode of platinum which electrode is capable of supporting said slurry and nonoxidizable in air at temperatures up to and including the temperature at which said ceramic material vitrifies, dipping said electrode into said slurry to apply a thin coating of said slurry on said electrode, heating said coating in situ to evaporate the water therefrom, vitrifying the ceramic material of said coating on said electrode at a temperature of approximately 2,000–2,500° F., and electrodepositing a metal layer on the vitrified ceramic material on said electrode to form a second electrode for the capacitor.

12. The method of making an electric capacitor which comprises providing a slurry consisting of water and powdered unvitrified ceramic material having a dielectric constant when vitrified of greater than 30, providing an electrode of palladium which electrode is capable of supporting said slurry and nonoxidizable in air at temperatures up to and including the temperature at which said ceramic material vitrifies, dipping said electrode into said slurry to apply a thin coating of said slurry on said electrode, heating said coating in situ to evaporate the water therefrom, vitrifying the ceramic material of said coating on said electrode at a temperature of approximately 2,000–2,500° F. and electrodepositing a metal layer on the vitrified ceramic material on said electrode to form a second electrode for the capacitor.

References Cited in the file of this patent

UNITED STATES PATENTS

| Number | Name | Date |
|---|---|---|
| 542,552 | Chance et al. | July 9, 1895 |
| 893,811 | Pickard | July 21, 1908 |
| 1,144,395 | Thomas | June 29, 1915 |
| 2,037,848 | Brennan | Apr. 21, 1936 |
| 2,253,026 | Godsey | Aug. 19, 1941 |
| 2,360,479 | Detrick | Oct. 17, 1944 |
| 2,395,442 | Ballard | Feb. 26, 1946 |
| 2,402,515 | Wainer | June 18, 1946 |
| 2,405,529 | Smith | Aug. 6, 1946 |
| 2,418,932 | Harr | Apr. 15, 1947 |
| 2,449,952 | Pridham | Sept. 21, 1948 |
| 2,504,178 | Burnham | Apr. 18, 1950 |
| 2,515,790 | Navias | July 18, 1950 |
| 2,607,825 | Eisler | Aug. 19, 1952 |
| 2,615,836 | Chester | Oct. 28, 1952 |
| 2,695,380 | Mayer et al. | Nov. 23, 1954 |
| 2,711,496 | Ruben | June 21, 1955 |
| 2,796,564 | Dymon | June 18, 1957 |

OTHER REFERENCES

Journal of the American Ceramic Society, vol. 30, No. 8, Aug. 1, 1947, pages 237–242.

Notice of Adverse Decision in Interference

In Interference No. 92,730 involving Patent No. 2,972,570, J. W. Haas and W. B. England, Thin film ceramic capacitor and method of making, final judgment adverse to the patentees was rendered Nov. 18, 1964, as to claims 1, 3, 6, 7, 8, 9 and 10.

[*Official Gazette January 19, 1965.*]